(12) United States Patent
Akiyama

(10) Patent No.: US 9,238,463 B2
(45) Date of Patent: Jan. 19, 2016

(54) DRIVING ASSISTANCE SYSTEM FOR VEHICLE AND SYSTEM FOR ESTIMATING FRICTIONAL STATE OF ROAD SURFACE

(75) Inventor: Tomonori Akiyama, Shizuoka-ken (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/394,645

(22) PCT Filed: Apr. 19, 2012

(86) PCT No.: PCT/JP2012/060564
§ 371 (c)(1),
(2), (4) Date: Oct. 15, 2014

(87) PCT Pub. No.: WO2013/157111
PCT Pub. Date: Oct. 24, 2013

(65) Prior Publication Data
US 2015/0066241 A1 Mar. 5, 2015

(51) Int. Cl.
| G06F 17/10 | (2006.01) |
| G06G 7/78 | (2006.01) |
| G06G 1/16 | (2006.01) |
| B60T 7/12 | (2006.01) |

(Continued)

(52) U.S. Cl.
CPC ............... *B60W 30/09* (2013.01); *B60W 10/18* (2013.01); *B60W 10/20* (2013.01); *B60W 2050/0008* (2013.01); *B60W 2050/0012* (2013.01); *B60W 2720/106* (2013.01); *B60W 2720/14* (2013.01)

(58) Field of Classification Search
CPC .... B60W 30/08; B60W 30/09; B60W 30/095
USPC .................................................... 701/96, 301
See application file for complete search history.

(56) References Cited

U.S. PATENT DOCUMENTS

| 2001/0020217 A1 | 9/2001 | Matsuno | |
| 2004/0193374 A1* | 9/2004 | Hac | ..................... B60K 31/0008 701/301 |

(Continued)

FOREIGN PATENT DOCUMENTS

| JP | 2001-247023 A | 9/2001 |
| JP | 2001-334842 A | 12/2001 |
| WO | 2011/030446 A1 | 3/2011 |

OTHER PUBLICATIONS

International Search Report of PCT/JP2012/060564, dated Jul. 24, 2012. [PCT/ISA/210].

*Primary Examiner* — Imran Mustafa
(74) *Attorney, Agent, or Firm* — Sughrue Mion, PLLC

(57) ABSTRACT

In a driving assistance system for a vehicle according to the present invention, when a solid object existing in the traveling direction of the driver's own vehicle is recognized, a target control value setting part sets a target control value pertaining to control for avoiding a collision including turning control of the driver's own vehicle in order to bring a running state of the driver's own vehicle to a target running state that causes the driver's own vehicle to avoid a collision with the solid object. A control part performs collision avoidance control in accordance with the target control value. Moreover, a control value correction part corrects the target control value pertaining to the turning control of the driver's own vehicle based on the value of a state variable relating to the running state of the driver's own vehicle during the time in which the control by said control part is performed and said target control value associated with said state variable.

2 Claims, 6 Drawing Sheets

(51) Int. Cl.
*G05D 1/00* (2006.01)
*G06F 7/00* (2006.01)
*G06F 17/00* (2006.01)
*B60W 30/09* (2012.01)
*B60W 10/18* (2012.01)
*B60W 10/20* (2006.01)
*B60W 50/00* (2006.01)

(56) References Cited

U.S. PATENT DOCUMENTS

2011/0295464 A1* 12/2011 Zagorski .................. B60T 7/18
                                                            701/41
2012/0158246 A1    6/2012 Takashima

* cited by examiner

DRIVING ASSISTANCE SYSTEM FOR VEHICLE AND SYSTEM FOR ESTIMATING FRICTIONAL STATE OF ROAD SURFACE

CROSS REFERENCE TO RELATED APPLICATIONS

This application is a National Stage of International Application No. PCT/JP2012/060564 filed Apr. 19, 2012, the contents of all of which are incorporated herein by reference in their entirety.

TECHNICAL FIELD

The present invention relates to a driving assistance technology such as collision avoidance for a driver's own vehicle.

BACKGROUND ART

In a prior art, a solid object existing ahead of the driver's own vehicle is detected, and when it is predicted that the driver's own vehicle will collide with the detected solid object, brake is actuated electrically to avoid a collision with the solid object by its braking force. However, in collision avoidance utilizing only braking force, the braking force varies depending on the condition of the road surface and the condition of tires, and collision avoidance sometimes necessitates sudden braking. In view of this, in a prior art, a collision avoidance operation by turning is performed when it is not possible to avoid a collision reliably by braking force (see, for example, patent document 1).

PRIOR ART DOCUMENTS

Patent Documents

Patent Document 1: Japanese Patent Application Laid-Open No. 2001-247023

SUMMARY OF THE INVENTION

Problems to be Solved by the Invention

In the case where a collision with a solid object is to be avoided by turning the driver's own vehicle, as is the case in the prior art, turning control of the driver's own vehicle is performed by automatically steering the driver's own vehicle. In this operation, if the road on which the driver's own vehicle is travelling is in a condition in which the frictional coefficient of its surface is low (e.g. when the vehicle is travelling in a rainy day), reaction force which the wheels of the driver's own vehicle receive from the road surface during the turning is small. This will give rise to a situation that does not match driver's feeling in driving.

The present invention has been made in view of the above-described various circumstances, and its object is to provide a driving assistance technology which enables stable running of a vehicle and matches driver's feeling in a system providing driving assistance such as avoidance of vehicle collision.

Means for Solving the Problems

In order to solve the above-described problem, in a system for assisting avoidance of a collision of a vehicle, a target control value pertaining to collision avoidance control is set in order to achieve a target running state for avoiding a collision of the driver's own vehicle with a solid object, and the target control value pertaining to turning control in the collision avoidance control is corrected based on the value of a state variable relating to the running state of the driver's own vehicle during the actual collision avoidance control and the target control value associated with the state variable. Correcting the target control value pertaining to turning control can lead to a decrease in the degree of steering for turning the driver's own vehicle, preventing the driver from having an uncomfortable feeling.

Specifically, a driving assistance system for a vehicle according to the present invention includes a recognition part that recognizes a solid object existing in the direction of traveling of a driver's own vehicle; a target control value setting part that sets, when the existence of said solid object is recognized by said recognition part, a target control value pertaining to control for avoiding a collision including turning control of the driver's own vehicle in order to bring a running state of the driver's own vehicle to a target running state that causes the driver's own vehicle to avoid a collision with said solid object; a control part that controls the running state of the driver's own vehicle to avoid a collision with said solid object, in accordance with said target control value set by said target control value setting part; and a control value correction part that corrects said target control value pertaining to the turning control of the driver's own vehicle based on the value of a state variable relating to the running state of the driver's own vehicle during the time in which the control by said control part is performed and said target control value associated with said state variable.

In the driving assistance system according to the present invention, when a solid object existing in the direction of travelling of the driver's own vehicle is recognized by the recognition part, the control part performs collision avoidance control in order to prevent the vehicle from colliding with the recognized solid object. The collision avoidance control performed by the control part includes turning control of the driver's own vehicle, and the collision avoidance control uses the target control value set by the target control value setting part. In the turning control of the driver's own vehicle, for example, an target avoidance trajectory along which the driver's own vehicle can travel to avoid a collision is calculated based on the running state of the driver's own vehicle, and the steering of the driver's own vehicle is operated in such a way as to generate a yaw rate needed for the vehicle to travel along the target avoidance trajectory. The turning control may be performed by a method other than the steering control. For example, the turning control may be performed by applying different braking forces to the right and left wheels of the driver's own vehicle.

The aforementioned target control value is such a control value that brings a running state of the driver's own vehicle to a target running state that causes the driver's own vehicle to avoid a collision with said solid object and is set by the target control value setting part. The target control value is set appropriately taking into consideration the details of the collision avoidance control performed in a specific driving assistance system according to the present invention. As described above, the target control value includes at least a control value pertaining to the turning control of the driver's own vehicle. The control part performs the collision avoidance control for the driver's own vehicle in accordance with the target control value thus set to bring the running state of the driver's own vehicle to the target running state, thereby avoiding a collision with the solid object.

When the collision avoidance control for the driver's own vehicle is performed by the control part, if the friction of the road surface on which the driver's own vehicle is travelling is relatively low, the reactive force that the vehicle receives from the road surface is small. Then, there is a possibility that the control performed by the control part in order to avoid a collision with the solid object cannot bring the running state of the driver's own vehicle to a state that enables the avoidance of a collision or the target running state successfully. In other words, when the friction of the road surface is low, there is a possibility that there remains a difference between the value of the state variable relating to the running state of the driver's own vehicle under the collision avoidance control by the control part and the target control value associated with the state variable. The state variable mentioned here is a variable that quantitatively represents the running state of the driver's own vehicle in a certain respect. For example, the state variable may be the speed or the acceleration of the driver's own vehicle.

When there is a difference between the value of the aforementioned state variable and the target control value associated with it, it is reasonable to conclude that the friction of the road surface on which the driver's own vehicle is travelling is relatively low. In this state, if the turning control of the driver's own vehicle is performed in accordance with the target control value set by the target control value setting part, the turning control of the driver's own vehicle is performed in a state in which the reactive force from the road surface is insufficient. In consequence, an uncomfortable feeling is given to the driver, while the actual running state of the driver's own vehicle does not change greatly.

In view of the above, in the driving assistance system for a vehicle according to the present invention, the target control value pertaining to the turning control of the driver's own vehicle, which is set by the target control value setting part, is corrected by the control value correction part based on the value of the aforementioned state variable and the target control value associated with it. This can reduce uncomfortable feeling given to the driver under circumstances where the reactive force from the road surface is insufficient and ensure stable running of the driver's own vehicle. In the driving assistance system according to the present invention, no particular limitations are placed on the details of the aforementioned collision avoidance control. However, in cases where, for example, it is desired to control the movement of the driver's own vehicle in turning or other operations in such a way as to achieve a certain state for a certain purpose, a condition required for the purpose (e.g. a condition that the lateral acceleration of the driver's own vehicle during turning must be kept below a predetermined acceleration) may be set in the collision avoidance control.

In the above-described driving assistance system, said control value correction part may correct said target control value pertaining to the turning control of the driver's own vehicle in such a way that when the difference between said target control value and the value of the state variable relating to the running state of the driver's own vehicle during the time in which the control by said control part is performed is larger than a predetermined reference difference, said target control value is changed to a control value that makes the amount of turning of the driver's own vehicle caused by the turning control smaller than when said difference is equal to or smaller than said predetermined reference difference or to a control value that obviates said turning control.

As above, the frictional state of the road surface on which the driver's own vehicle for which the collision avoidance control is performed is travelling is estimated based on the difference between the target control value and the value of the state variable relating to the running state of the driver's own vehicle during the time in which the collision avoidance control by said control part is performed. When the aforementioned difference is larger than the predetermined reference difference serving as a criterion, it is concluded that the road surface is in a low friction state in which the friction is low for performing the turning control of the driver's own vehicle for avoiding a collision. Then, the target control value pertaining to the turning control is corrected to a control value that makes the amount of turning smaller, whereby it is possible to prevent the driver to have an uncomfortable feeling.

In the above-described driving assistance system, said target control value setting part may set as said target control value a target deceleration in decelerating the driver's own vehicle for the purpose of avoiding a collision with said solid object and a target turning amount for the amount of turning of the driver's own vehicle in the turning control of the driver's own vehicle performed for the purpose of avoiding a collision. Moreover, said control value correction part may correct the target turning amount pertaining to the turning control of the driver's own vehicle in such a way that when the difference between said target deceleration and the deceleration of the driver's own vehicle during the time in which the control by said control part is performed is larger than said predetermined reference difference, said target turning amount is changed to a control value that makes the amount of turning of the driver's own vehicle caused by said turning control smaller than when said difference is equal to or smaller than said predetermined reference difference or to a control value that obviates said turning control.

As above, the deceleration of the driver's own vehicle during the collision avoidance control is used as a parameter representative of the frictional state of the road surface on which the driver's own vehicle is travelling. When the road surface is in a low friction state, it is considered that the deceleration resulting from braking performed as the collision avoidance control does not reach a target deceleration (i.e. a target deceleration as the target control value for the deceleration) successfully. Therefore, when this difference in the deceleration is larger than the predetermined reference difference, it is reasonable to conclude that the road surface is in a low friction state. Then, as described above, the target turning amount pertaining to the turning control is corrected to a control value that makes the amount of turning smaller, whereby it is possible to prevent the driver to have an uncomfortable feeling.

In the above-described driving assistance system, said target control value setting part may set as said target steering amount a feed forward control value for feed forward control in the turning control of the driver's own vehicle performed to achieve said target running state and a feedback control value for feedback control performed to bring an actual turning state of the driver's own vehicle resulting from said feed forward control to a target turning state of the driver's own vehicle in said target running state. Moreover, said control value correction part may set as said target turning amount only said feed forward control value, when the difference between said target deceleration and the deceleration of the driver's own vehicle during the time in which the control by said control part is performed is larger than said predetermined reference difference, and set as said target turning amount said feed forward control value and said feedback control value, when said difference is equal to or smaller than said predetermined reference difference.

In the above-described driving assistance system, the target control value set by the target control value setting part includes a feed forward control value and a feedback control value. Among them, the feedback control value is a control value effective in eliminating a difference from the target value resulting from the feed forward control. However, in a low friction state in which the reactive force from the road surface is small, the feedback control value tends to be large because of the nature of the feedback control, likely giving an uncomfortable feeling to the driver. In view of this, when the difference between the actual deceleration under the collision avoidance control and the target deceleration is larger than the predetermined reference difference, namely when it is reasonable to conclude that the road surface is in a low friction state, the feedback control value is not used as the target control value, and only the feed forward control value is used. On the other hand, when the aforementioned difference is equal to or smaller than the predetermined reference difference, it is considered that the road surface is in a state in which the friction is relatively high. Then, the feedback control value and the feed forward control value are both used, enabling effective collision avoidance.

The present invention can also be regarded, in an aspect thereof, as a road surface frictional state estimation system for estimating the frictional state of the road surface on which the driver's own vehicle is travelling. Specifically, according to the present invention, there is provided a system for estimating a frictional state of road surface comprising: a target control value acquisition part that acquires, in order to bring a running state of a driver's own vehicle to a target running state that causes the driver'sown vehicle to avoid a collision with a solid object existing in the direction of traveling of the driver's own vehicle, a target control value pertaining to control for avoiding a collision; a driver's own vehicle running state acquisition part that acquires the running state of the driver's own vehicle during the time in which said control for avoiding a collision is performed in accordance with said target control value; and a frictional state estimation part that estimates a frictional state of a road surface on which the driver's own vehicle is travelling based on said target control value and said running state of the driver's own vehicle. As above, it is possible to estimate the frictional state of the road surface on which the driver's own vehicle is travelling, in particular it is possible to reasonably determine whether the road surface is in a low friction state or not, by using a control value in the control for avoiding a collision of the driver's own vehicle with a solid object. The technical idea for reasonably determining whether the road surface is in a low friction state has already been described in the above description of the driving assistance system for a vehicle.

Advantageous Effect of the Invention

The present invention can provide a driving assistance technology which enables stable running of a vehicle and matches driver's feeling in a system providing driving assistance such as avoidance of vehicle collision.

EMBODIMENTS FOR CARRYING OUT THE INVENTION

In the following, specific embodiments of the present invention will be described with reference to the drawings. Described here is a case in which the present invention is applied to a system which determines the track of the driver's own vehicle and a solid object constituting an obstacle and performs driving assistance for preventing deviation from the track thus determined and avoiding a collision with the solid object or reducing damage in a collision. The features described with the following embodiment relate to a mode of the present invention and are not intended to limit the features of the present invention.

<Embodiment 1>

Figure 1:
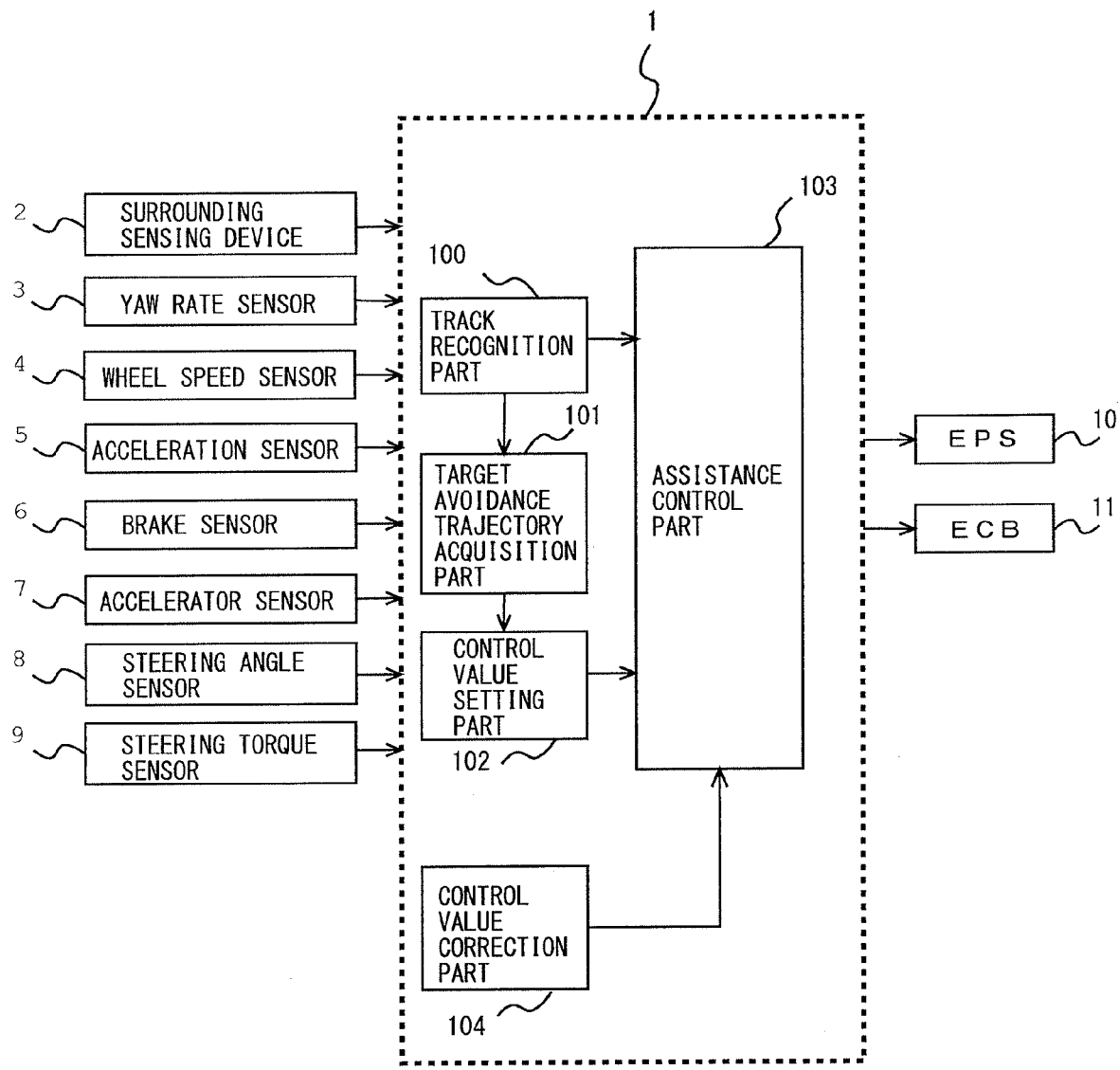
FIG. 1 is a diagram showing configuration of a driving assistance system for a vehicle according to the present invention.

Firstly, a first embodiment of the present invention will be described. FIG. 1 is a block diagram showing the configuration of a driving assistance system for a vehicle according to the present invention on a function-by-function basis. As shown in FIG. 1, a vehicle is equipped with a control unit (ECU) 1 for driving assistance.

The ECU 1 is an electronic control unit having a CPU, a ROM, a RAM, a backup RAM, and I/O interface. The ECU 1 is electrically connected with various sensors such as a surrounding sensing device 2, a yaw rate sensor 3, a wheel speed sensor 4, an acceleration sensor 5, a brake sensor 6, accelerator sensor 7, a steering angle sensor 8, and a steering torque sensor 9. Signals output from these sensors are input to the ECU 1.

Figure 4:
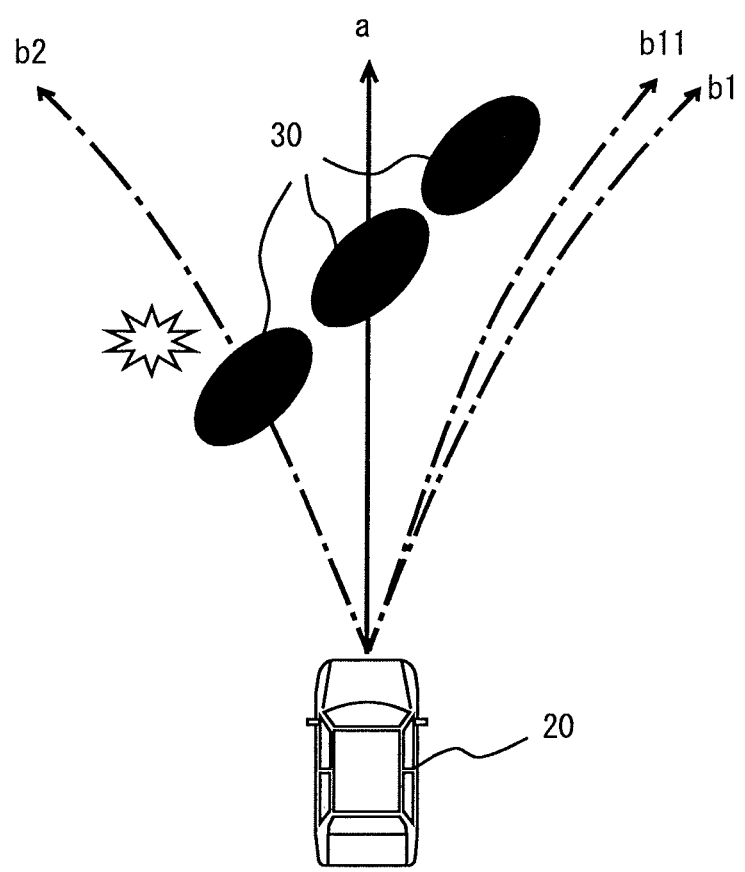
FIG. 4 is a diagram illustrating avoidance target trajectories that a vehicle can take to avoid a collision with a solid object existing in its travelling direction.

The surrounding sensing device 2 includes, for example, at least one measurement device selected from among an LIDAR (Laser Imaging Detection And Ranging), an LRF (Laser Range Finder), a millimeter-wave radar, and a stereo camera. The surrounding sensing device 2 acquires, by detection, information about a relative position (e.g. relative distance and/or relative angle) of the driver's own vehicle 20 (see FIG. 4) and a solid object 30 (see FIG. 4) existing in the surrounding of the vehicle. The acquisition of information about the solid object 30 by the surrounding sensing device 2 has been commonly disclosed in prior arts, and details thereof will not be described in this specification. The yaw rate sensor 3 is mounted, for example, on the body of the driver's own vehicle 20 and outputs an electrical signal correlating with the yaw rate of the driver's own vehicle 20. The wheel speed sensor 4 is a sensor that is attached to a wheel of the driver's own vehicle 20 and outputs an electrical signal correlating with the running speed of the vehicle (vehicle speed). The acceleration sensor 5 outputs electrical signals correlating with the acceleration of the driver's own vehicle 20 in the front-rear direction (longitudinal acceleration) and the acceleration of the driver's own vehicle 20 in the left-right direction (lateral acceleration). The brake sensor 6 is attached, for example, to a brake pedal provided in the cabin and outputs an electrical signal correlating with the operation torque of (or depression force exerted on) the brake pedal. The accelerator sensor 7 is attached, for example, to an accelerator pedal provided in the cabin and outputs an electrical signal correlating with the operation torque of (or depression force exerted on) the accelerator pedal. The steering angle sensor 8 is attached, for example, to a steering rod connected with a steering wheel provided in the cabin and outputs an electrical signal correlating with the rotational angle of the steering wheel (rotational angle) relative to a neutral position. The steering torque sensor 9 is attached to the steering rod and outputs an electrical signal correlating with the toque (steering torque) exerted on the steering wheel.

The ECU 1 is also connected with various devices such as an EPS (electric power steering) 10 and an ECB (electronically controlled brake) 11. These devices are electrically controlled by the ECU 1. The EPS 10 is a device that assists the steering torque of the steering wheel utilizing torque generated by an electric motor. The ECB 11 is a device that electrically adjusts the operation oil pressure (brake oil pressure) of friction brakes provided for the respective wheels.

With the driving assistance system having the above-described configuration shown in FIG. 1, assistance control for collision avoidance and/or other purposes is carried out by the ECU 1 through electrically controlling the EPS and the ECB 11 based on information provided by the aforementioned various sensors connected to the ECU 1. In other words, the ECU 1 has functions as specified as the functional blocks shown in FIG. 1 to control various devices utilizing signals output from the aforementioned various sensors so as to avoid a collision with a solid object 30. Specifically, the ECU 1 has a track recognition part 100, an target avoidance trajectory acquisition part 101, a control value setting part 102, an assistance control part 103, and a control value correction part 104.

The track recognition part 100 generates information about the road (track) on which the driver's own vehicle 20 will travel, on the basis of information output from the surrounding sensing device 2. For example, the track recognition part 100 generates information about the coordinates of the positions of solid objects 30 that can be obstacles to the driver's own vehicle 20 and indexes indicating lane boundaries (e.g. road markings such as white or yellow lines indicating lane boundaries and solid objects 30 such as curbstones, guard rails, grooves, walls, and poles extending along and on the sides of the lane) in a coordinate system having an origin at the position of the driver's own vehicle 20 and information about the posture of the driver's own vehicle 20 relative to the solid objects 30 and lane boundaries (e.g. the distances and yaw angles relative to them). The track recognition part 100 corresponds to the recognition part according to the present invention.

Figure 2:
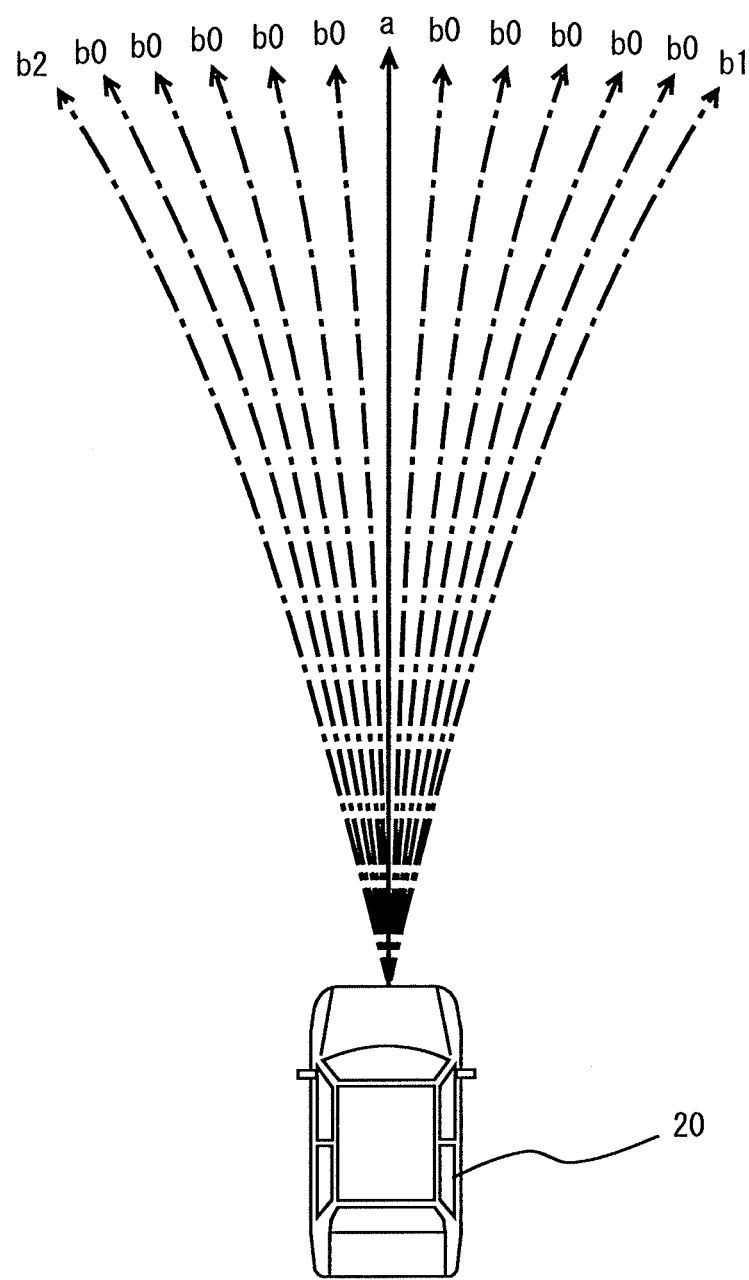
FIG. 2 is a diagram illustrating a range in which solid objects are sensed while a vehicle is running.

The target avoidance trajectory acquisition part 101 acquires an target avoidance trajectory that the driver's own vehicle 20 can take to avoid a collision with the solid objects 30 recognized by the track recognition part 100 in the coordinate system generated by the track recognition part 100. The target avoidance trajectory is a trajectory that is acquired based on the state of the driver's own vehicle 20, e.g. based on the vehicle speed and the lateral acceleration of the driver's own vehicle 20 and deceleration resulting from braking. Specifically, the target avoidance trajectory acquisition part 101 acquires the current lateral acceleration $Gy0$ of the driver's own vehicle 20 from an output signal of the acceleration sensor 5 and specifies a path that the driver's own vehicle 20 will follow if the driver's own vehicle 20 will continue to run while maintaining the current lateral acceleration $Gy0$, as shown in FIG. 2. Then, the target avoidance trajectory acquisition part 101 specifies a path b1 that driver's own vehicle 20 is predicted to follow if a maximum change $\Delta Gy$ in the lateral force that allows the driver's own vehicle 20 to turn safely at the current speed of the driver's own vehicle 20 is added to the current lateral acceleration $Gy0$ of the driver's own vehicle 20 and also specifies, on the other hand, a path b2 that driver's own vehicle 20 is predicted to follow if a maximum change $\Delta Gy$ in the lateral acceleration that allows the driver's own vehicle 20 to turn safely at the current speed of the driver's own vehicle 20 is subtracted from the current lateral acceleration $Gy0$ of the driver's own vehicle 20. The aforementioned maximum change $\Delta Gy$ is set taking into consideration factors relevant to safe travelling of the driver's own vehicle, such as ensured deceleration needed in braking, the structure of the driver's own vehicle, and steering by the driver.

More specifically, in specifying the paths b1 and b2, the target avoidance trajectory acquisition part 101 may calculate the turning radius R of the driver's own vehicle from the value obtained by adding/subtracting the maximum change $\Delta Gy$ to/from the current lateral acceleration $Gy0$ and specify the paths b1 and b2 on the basis of the calculated turning radius R. The turning radius R can be calculated by dividing the vehicle speed V by the yaw rate $\gamma$ ($R=V/\gamma$), and the yaw rate $\gamma$ can be calculated by dividing the lateral acceleration $Gy$ by the vehicle speed V ($\gamma=Gy/V$). The measurement value of the yaw rate sensor 3 may also be used as the yaw rate $\gamma$. Then, the target avoidance trajectory acquisition part 101 specifies paths b0 associated with regular-step variations in the lateral acceleration, in the range (travel range) from the aforementioned path b1 to path b2. The step width in this regular-step variations in the lateral acceleration may be set fitly. Based on the degree of interference of a solid object 30 existing ahead in the travelling direction of the driver's own vehicle 20 with the paths b1 and b2 and the plurality of paths b0 set between them, a trajectory that allows the driver's own vehicle 20 to avoid a collision with the solid object 30 without interference by turning the driver's own vehicle is specified as the target avoidance trajectory.

Then, the control value setting part 102 sets values of control variables (control values) in control of the EPS 10 and ECB 11 needed to achieve the travelling along the target avoidance trajectory for avoiding a collision with the solid object 30 acquired by the target avoidance trajectory acquisition part 101. For example, in the case where the brake is applied to the wheels of the driver's own vehicle 20 through the ECB 11 and the driver's own vehicle 20 is turned by operating the steering to avoid a collision with the solid object 30, the aforementioned controlled variables are the deceleration of the driver's own vehicle 20 (i.e. the acceleration in the direction opposite to the traveling direction of the driver's own vehicle) caused by a braking force needed to avoid a collision and the steering operation angle or the steering torque for steering operation for turning the driver's own vehicle 20, and target values (target control values) for the respective controlled variables are set. The control value setting part 102 also sets parameters (such as gains) used in a control loop specifically prepared in controlling the EPS 10 and the ECB 11. The control value setting part 102 corresponds to the target control value setting part according to the present invention.

Then, the assistance control part 103 performs driving assistance control for avoiding a collision with the solid object 30 and for reducing impact or damage in collision by means of the EPS 10 and the ECB 11 in accordance with the target control values for avoiding a collision set by the control value setting part 102. The assistance control part 103 corresponds to the control part according to the present invention. For example, in order to avoid a collision of the driver's own vehicle 20 with the solid object 30, the assistance control part 103 may perform feed forward control based on a preset control map that specifies relationship between the running state of the driver's own vehicle and target control values or feedback control that makes the difference between a parameter (state variable) concerning the actual state of the driver's own vehicle and a target control value associated with it equal to zero. The method of decelerating the vehicle is not limited to operating the friction brake by the ECB 11, but other methods such as converting the kinetic energy of the vehicle into electrical energy (regeneration) and increasing the engine brake by changing the change gear ratio of the change gear may be employed.

Then, the control value correction part 104 corrects, in particular, a target control value pertaining to steering for turning the driver's own vehicle among the target control values for avoiding a collision set by the control value setting part 102. For example, when the road surface on which the driver's own vehicle is travelling is in a condition in which the friction is relatively low, the reactive force the driver's own vehicle receives from the road surface is low. Then, there is a possibility that turning control of the driver's own vehicle cannot be performed satisfactorily with the target control value set by the control value setting part 102. On the other hand, if the running state of the driver's own vehicle with respect to turning thereof is changed to a certain state in order to avoid a collision, the driver may have an uncomfortable feeling. In order to prevent such a situation from occurring as much as possible, the control value correction part 104 corrects the target control value. The control for avoiding a collision with the solid object including the correction of the target control value will be described later.

Figure 3:
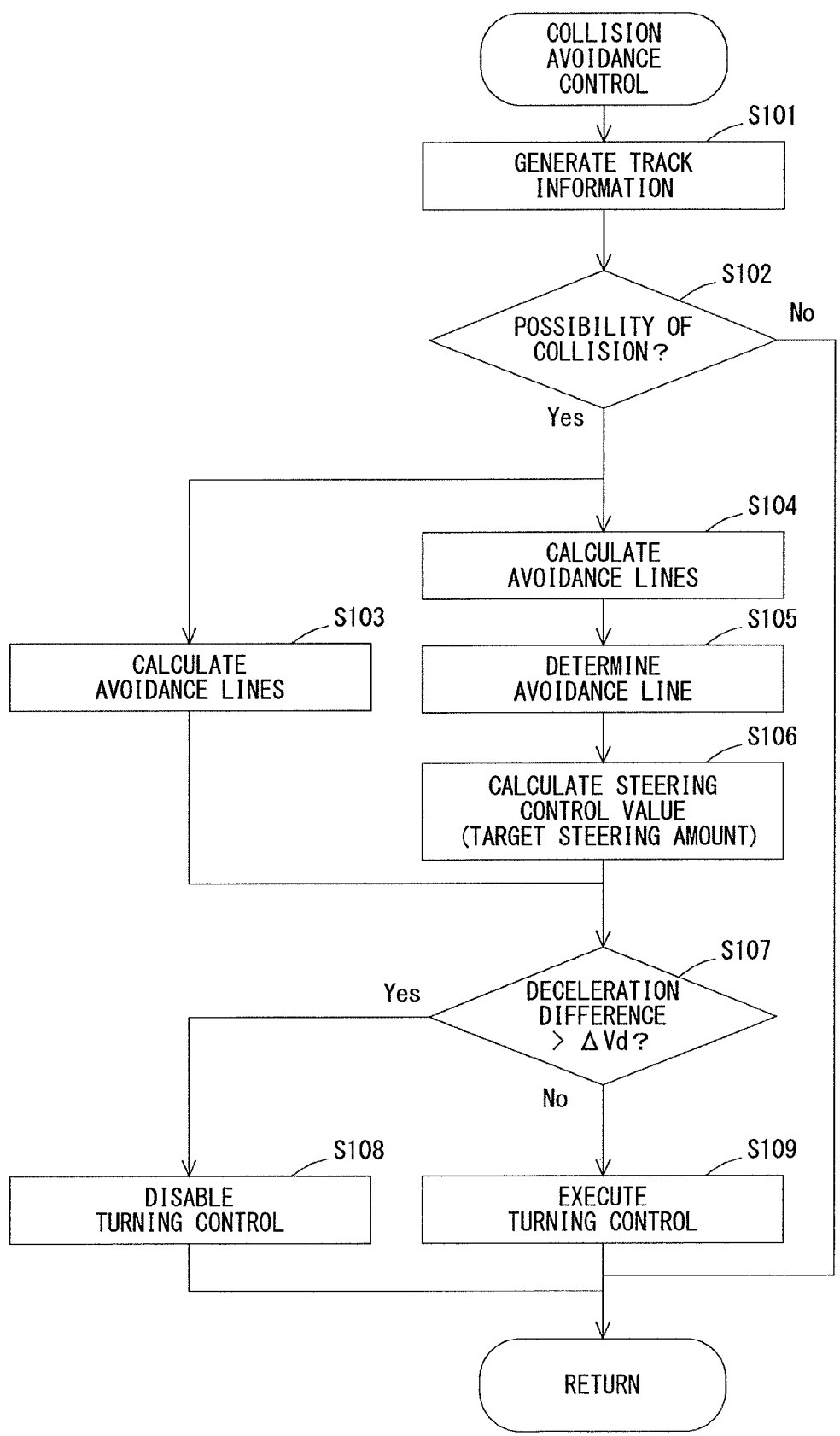
FIG. 3 is a first flow chart of collision avoidance control performed as driving assistance processing in the driving assistance system for a vehicle shown in FIG. 1.

Control for collision avoidance executed in the driving assistance system for a vehicle having the above-described construction will now be described with reference to FIG. 3. The control shown in FIG. 3 is a processing routine executed repeatedly by the ECU 1 and stored in advance as a control program in the ROM or the like of the ECU 1. Firstly in step S101, information about the road on which the driver's own vehicle 20 will travel in the feature is generated based on an output signal of the surrounding sensing device 2. Specifically, the ECU 1 generates information about the coordinates of the positions of solid objects 30 that can be obstacles to the driver's own vehicle 20 and indexes indicating lane boundaries in a coordinate system having its origin at the location of the driver's own vehicle and the posture of the driver's own vehicle 20 relative to the solid objects 30 and the lane boundaries. After completion of the processing of step S101, the process proceeds to step S102.

Then in step S102, the ECU 1 determines, based on the information generated in the above step S101, whether or not there is a solid object 30 that can be an obstacle in the travelling path of the driver's own vehicle 20. The "travelling path" mentioned above is a path along which the driver's own vehicle 20 is predicted to travel if it continues to run while maintaining the current lateral acceleration Gy0 (e.g. path a in FIG. 2). If there is a solid object 30 in this predicted path, or if there is a solid object 30 in an area within a certain distance from this path, it is determined that there is a solid object 30 in the travelling path of the driver's own vehicle 20. If the determination made in step S102 is affirmative, the process proceeds to steps S103 and S104. If the determination made in step S102 is negative, the ECU 1 once terminates the execution of this routine. The above-described processing of steps S101 and S102 corresponds to the processing by the above-described track recognition part 100.

If the determination made in step S102 is affirmative, namely if it is determined that there is a possibility that the driver's own vehicle 20 will collide with the solid object 30, the processing of step S103 for braking of the driver's own vehicle 20 and the processing of steps S104 to S106 for steering for turning the driver's own vehicle 20 are executed in parallel. Firstly in step S103, in order to achieve the target control value for deceleration set by the control value setting part 102 or the target deceleration needed to avoid a collision, the ECU 1 sends a deceleration command to the ECB 11 to start deceleration control for the driver's own vehicle 20. In connection with the target deceleration of the driver's own vehicle 20, a control map that associates running states of the driver's own vehicle 20 such as vehicle speeds and distances from the driver's own vehicle 20 to the solid object 30 with target decelerations is prepared in advance by previous experiments and stored in the memory of the ECU 1. A target deceleration can be set by accessing this control map. The target decelerations in this control map shall be set on assumption that the road surface on which the driver's own vehicle is travelling is in a condition in which the friction is relatively high (i.e. not a road surface in a rainy day or frozen road surface but a road surface in a dry condition). The deceleration control started in step S103 will be basically continued until the possibility of a collision of the driver's own vehicle 20 with the solid object 30 is eliminated.

Processing of steps S104 to S106 executed in parallel with the processing of step S103 will now be described. The processing of steps S104 to S106 is preparatory processing for the turning control of the driver's own vehicle 20 and executed by the control value setting part 102. Firstly in step S104, the target avoidance trajectory acquisition part 101 reads the current lateral acceleration Gy0 of the driver's own vehicle 20 through the acceleration sensor 5, calculates a travel range in which the driver's own vehicle 20 can travel by adding/subtracting the aforementioned maximum change $\Delta Gy$ in the lateral acceleration to/from the base lateral acceleration Gy0 thus read, and calculates travel trajectories that enable avoidance of the interference of this travel range with the solid object 30 as avoidance lines (avoidance target trajectories). In this connection, the maximum change $\Delta Gy$ in the lateral acceleration is calculated on condition that the braking torque with the deceleration control executed in step S103 is exerted. After comletion of the processing of step S104, the process proceeds to step S105.

In step S105, a determination is made as to which avoidance line, among the avoidance lines calculated in step S104, the driver's own vehicle 20 is to travel along. In this embodiment, a case in which the driver's own vehicle 20 and the solid object 30 are in the positional relationship shown in FIG. 4 will be discussed. In the case shown in FIG. 4, where the solid object 30 exists in the course of the driver's own vehicle 20 and extends obliquely in such a way as to be near on the left and far on the right to the driver's own vehicle 20 with its width being relatively large, while there are path b1 and path b11 constituting avoidance lines on the side of the path b1 associated with the maximum change $+\Delta Gy0$ in the lateral acceleration, there are no avoidance lines on the side of the path b2 associated with the maximum change $-\Delta Gy$ in the lateral acceleration. Because the solid object 30 extends in such a way as to be near on the left and far on the right to the driver's own vehicle 20, even if the lateral acceleration changes in the negative direction by the maximum $\Delta Gy0$ so that the driver's own vehicle 20 travels along the path b2, the solid object 30 interferes with the path b2. In this case, the avoidance line along which the driver's own vehicle 20 can travel is either path b1 or path b11.

The way of selecting an avoidance line among the avoidance lines b1 and b11 may be arranged fitly in accordance with purposes. For example, letting $\gamma 1$ and $\gamma 11$ be avoidance yaw rates that cause the driver's own vehicle to travel along the avoidance lines b1 and b11 respectively, they are in the relationship $\gamma 1 > \gamma 11$, as will be understood from the difference in the curvature radius of the driver's own vehicle 20. In view of this, for the purpose of making the yaw rate in turning as low as possible, the avoidance line b11 may be selected as a trajectory to be taken in the turning control. As another method, an avoidance line with which the absolute value |γ| of the avoidance yaw rate γ associated with each of the avoidance lines calculated in step S104 is equal to or smaller than a predetermined threshold γ0 may be selected. This threshold γ0 sets an upper limit of the absolute value of the lateral acceleration in turning the driver's own vehicle 20 in order to allow the driver to override the turning control in the middle of the control performed on the EPS 10 by the ECU 1. For example, the threshold γ0 may be set between 0.2 G and 0.3 G. Selecting an avoidance line satisfying the above-described condition allows steering by the driver, while enabling the driver's own vehicle 20 to avoid a collision with the solid object 30. In view of the above, it is assumed in this embodiment that the path b11. is selected as the avoidance line along which the driver's own vehicle is to travel. After completion of the processing of step S105, the process proceeds to step S106.

In step S106, a steering control value (target steering angle) in steering by the EPS 10 needed to cause the driver's own vehicle 20 to travel along the avoidance line determined in step S105 is calculated. Specifically, a control map concerning the target steering angle that associates running states of the driver's own vehicle 20 such as vehicle speeds and yaw rates needed to cause the driver's own vehicle 20 to travel along avoidance lines with target steering angles is prepared in advance by previous experiments and stored in the memory of the ECU 1. A target steering angle can be set by accessing this control map. After completion of the processing in step S106, the process proceeds to step S107.

At the time when the process proceeds to step S107, while the deceleration processing by means of the ECB 11 according to step S103 has been started, the turning control by means of the EPS 10 has not been started, and the target steering angle for the turning control has been calculated. In step S107, a determination is made as to the magnitude of the deceleration of the driver's own vehicle 20 caused by the deceleration control that has already been started. Specifically, it is determined whether the difference (which will be hereinafter referred to as the "deceleration difference") between the target deceleration set by the control value setting part 102 upon starting the deceleration control in step S103 and the current deceleration of the driver's own vehicle 20 is larger than a predetermined deceleration difference ΔVd or not. When the friction of the road surface on which the driver's own vehicle 20 is travelling is low, if the driver's own vehicle is decelerated by means of the EBC 11 in accordance with the target deceleration as set, it is difficult for a sufficient friction force to be generated between the road surface and the wheels of the driver's own vehicle, and therefore it is difficult to make the deceleration of the driver's own vehicle equal to the target deceleration. Moreover, it is considered that the lower the friction on the road surface is, the larger the difference between the actual deceleration of the driver's own vehicle and the target deceleration or the deceleration difference is. Therefore, when the deceleration difference is larger than the predetermined deceleration difference ΔVd, it is reasonable to conclude that the road surface is in a low friction state in which the driver's own vehicle cannot be decelerated sufficiently. In view of the above, if the determination made in step S107 is affirmative, the process proceeds to step S108. If the determination made in step S107 is negative, the process proceeds to step S109.

In step S108, since the road surface is in a low friction state in view of the fact that the deceleration difference is larger than the predetermined deceleration difference ΔVd, the turning control by means of the EPS 10 in accordance with the target steering angle calculated in step S106 is disabled. In the case where the road surface is in a low friction state, if the steering operation is performed by means of the EPS 10 in accordance with the target steering angle, it is difficult to turn the driver's own vehicle adequately in agreement with the steering operation, because a sufficient reactive force cannot be exerted by the road surface. In consequence, operation to turn the driver's own vehicle adequately may give an uncomfortable feeling to the driver. In view of this, in this case, the processing of step S108 disables the turning control of the driver's own vehicle. Then, in this case, avoidance of a collision of the driver's own vehicle 20 with the solid object 30 is achieved only by the deceleration control by means of the ECB 11.

The processing of disabling the turning control based on the deceleration difference corresponds to processing of correcting the target steering angle set in step S106 for the turning control to a steering angle that does not bring about a turning of the driver's own vehicle 20 (for example, in the case where the driver's own vehicle is travelling straight ahead, a steering angle equal to zero). Therefore, the processing executed in step S108 based on the result of the determination in step S107 corresponds to the processing executed by the control value correction part 104.

On the other hand, when the deceleration difference is equal to or smaller than the predetermined deceleration difference ΔVd, it is considered that the road surface is in a condition in which the friction is relatively high, and the above-described problem of uncomfortable feeling to the driver is unlikely to arise. Therefore, in step S109, the turning control by means of the EPS 10 in accordance with the target steering angle calculated in step S106 is started. Thus, in this case, avoidance of a collision of the driver's own vehicle 20 with the solid object 30 is achieved by the deceleration control by means of the ECB 11 and the turning control by means of the EPS 10.

As described above, in this embodiment, the deceleration control is started to avoid a collision with the solid object 30, and whether another control for avoiding a collision, that is the turning control, is to be executed or disabled is determined based on the difference between the target deceleration set for the deceleration control and the actual deceleration resulting from the deceleration control. Executing the collision avoidance control in this way can reduce uncomfortable feeling given to the driver as much as possible and achieve collision avoidance adapted to the friction state of the road surface on which the driver's own vehicle 20 is travelling.

<Modification>

While the above-described embodiment focuses on a driving assistance system for a vehicle as one aspect of the present invention, the present invention can also be regarded as a system for estimating the frictional state of the road surface on which a vehicle is travelling, in particular, as a system for estimating whether or not the road surface is in a low friction state (road surface frictional state estimation system). In this case, in the collision avoidance control shown in FIG. 3, the part that calculates a target deceleration set for the deceleration control and the part that calculates the actual deceleration of the driver's own vehicle resulting from the deceleration control correspond to the target control value acquisition part and the driver's own vehicle running state acquisition part according to the present invention respectively. The processing of determining whether or not the deceleration difference or the difference between the target deceleration and the actual deceleration of the driver's own vehicle is larger than the predetermined deceleration difference ΔVd (the processing of step S107) corresponds to the processing of determining whether the road surface is in a low friction state or the processing executed by the frictional state estimation part according to the present invention.

As described above, the above-described embodiment includes an embodiment of an aspect of the present invention as a road surface frictional state estimation system. This also applies to the other embodiments of the driving assistance system for a vehicle described in the following.

<Embodiment 2>

Figure 5:
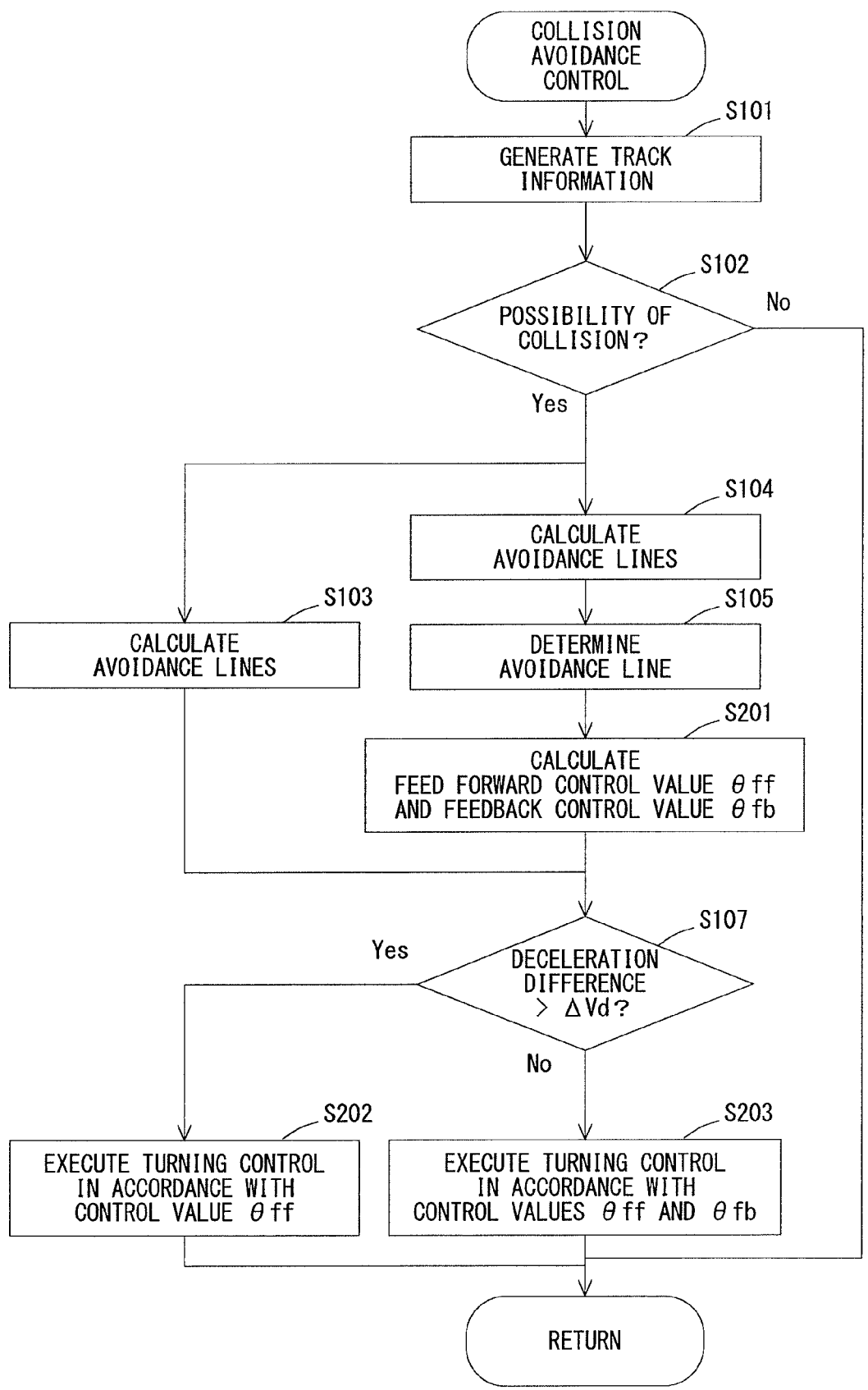
FIG. 5 is a second flow chart of collision avoidance control performed as driving assistance processing in the driving assistance system for a vehicle shown in FIG. 1.

A second embodiment of collision avoidance control executed by the driving assistance system shown in FIG. 1 will be described with reference to FIG. 5. Among the steps constituting the collision avoidance control shown in FIG. 5, the steps same as those in the collision avoidance control shown in FIG. 3 will be denoted by the same reference numerals and will not be described in detail. In the collision avoidance control shown in FIG. 5, when it is determined that there is a possibility of a collision with a solid object 30 in the same manner as in the case shown in FIG. 3, deceleration control is started in step S103, and processing of setting a target steering angle for turning control of the driver's own vehicle 20 is executed in steps S104, S105, and S210.

In this embodiment, feed forward control and feedback control are performed in steering operation for turning control of the driver's own vehicle 20. A control map for steering operation by means of the EPS 10 associated with the running state (such as the vehicle speed) of the driver's own vehicle 20 is stored in the memory of the ECU 1. In the feed forward control, a control value (or target steering angle) to be given to the EPS 10 is derived from the control map based on the actual running state of the vehicle sensed by the sensors shown in FIG. 1, and steering control is performed based on this control value. In the feedback control, in order to make the difference between the actual amount of turning of the vehicle resulting from the feed forward control and the amount of turning needed to avoid a collision equal to zero, steering angle control is further performed in accordance with a control value calculated by multiplying this difference by a gain. Specific control loop designs of the feed forward control and the feedback control may employ various known arrangements, and they are not limited to specific control loop designs, in the present invention.

Employing both the feed forward control and the feedback control can increase the response speed of the turning control and makes it possible to bring the turning state of the driver's own vehicle to an intended state precisely. In this embodiment, after completion of the processing of step S105, the processing of step S201 is executed. In step S201, a control value θff pertaining to the above-described feed forward control and a control value θfb in the above-described feedback control are set. Specifically, as to the control value θff, a target steering angle is set according to the aforementioned control map. As to the control value θfb, a gain and an offset used in the feedback control etc. are set based on the running state of the driver's own vehicle 20 and the distance between the driver's own vehicle 20 and the solid object 30 etc. After completion of the processing of step S201, the process proceeds to step S107. Therefore, at the time when the process proceeds to step S107, the turning control of the driver's own vehicle 20 has not been started yet, as is the case in the collision avoidance control shown in FIG. 3.

If the determination made in step S107 is affirmative, which means that the road surface is in a low friction state, the process proceeds to step S202, where turning control of the driver's own vehicle 20 is performed in accordance only with the control value θff pertaining to the feed forward control. When the road surface is in a low friction state, the reactive force from the road surface is small. Then, performing the feedback control in the turning control would make the turning state of the driver's own vehicle closer to the actual turning state, possibly giving an uncomfortable feeling to the driver. In view of this, in such cases, the turning control of the driver's own vehicle is performed only by the feed forward control by the processing in step S202.

The processing of performing only the feed forward control based on the deceleration difference corresponds to processing of correcting the control value θfb pertaining to the feedback control for the turning control set in step S106 to a control value that does not bring about a turning of the driver's own vehicle 20 by the feedback control, namely a control value that makes the amount of turning of the driver's own vehicle smaller (e.g. a gain equal to zero). Therefore, the processing of step S202 executed based on the result of the determination in step S107 corresponds to the processing performed by the control value correction part 104.

If the determination made in step S107 is negative, which means that the road surface is not in a low friction state, the process proceeds to step S203, where turning control of the driver's own vehicle 20 is performed in accordance with the control value θff pertaining to the feed forward control set in step S201 and the control value pertaining to the feedback control. When the road surface is not in a low friction state, the problem of uncomfortable feeling to the driver is unlikely to arise. Therefore, the possibility that performing the turning control by thefeedback control gives an uncomfortable feeling to the driver is low.

<Embodiment 3>

Figure 6:
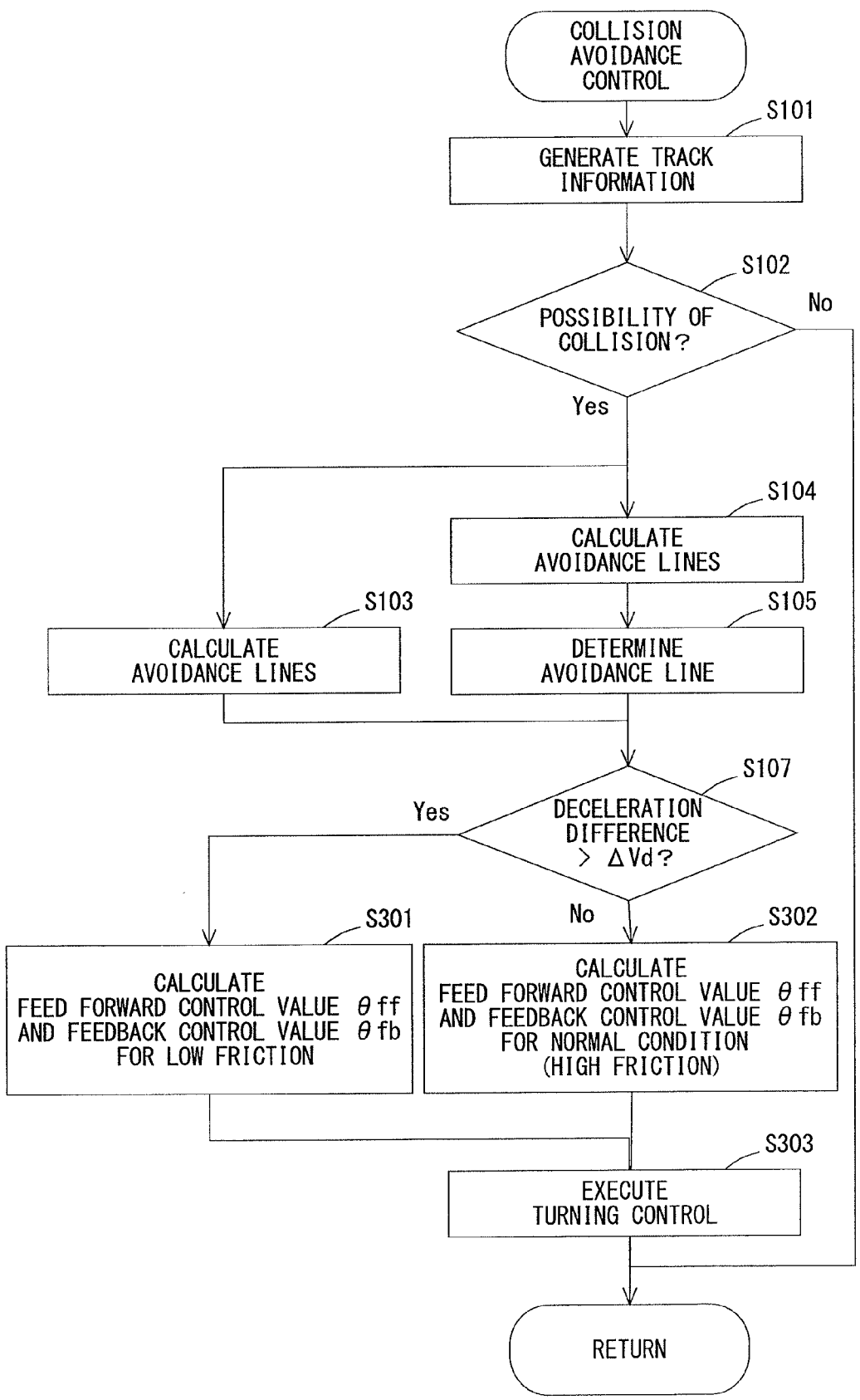
FIG. 6 is a third flow chart of collision avoidance control performed as driving assistance processing in the driving assistance system for a vehicle shown in FIG. 1.

A third embodiment of collision avoidance control executed by the driving assistance system shown in FIG. 1 will be described with reference to FIG. 6. Among the steps constituting the collision avoidance control shown in FIG. 6, the steps same as those in the collision avoidance control shown in FIG. 3 will be denoted by the same reference numerals and will not be described in detail. In the collision avoidance control shown in FIG. 6, if it is determined that there is a possibility of a collision with a solid object 30, the deceleration control is started in step S103, and the processing of determining an avoidance line of the driver's own vehicle 20 is executed in steps S104 and S105.

In this embodiment, feed forward control and feedback control are performed in the turning control of the driver's own vehicle 2, as with the case of the above-described second embodiment. Characteristics of these controls have already been described in the above description of the second embodiment. In this embodiment, after completion of the processing of step S105, the process proceeds to step S107 without setting control values (a feed forward control value θff and a feedback control value θfb) for the turning control.

If the determination in step S107 is affirmative, which means that the road surface is in a low friction state, the process proceeds to step S301, where a feed forward control value θff and a feedback control value θfb for cases in which the road surface is in a low friction state are set. Specifically, a low friction control map for steering operation by means of the EPS 10 adapted to the running state (such as the vehicle speed) of the driver's own vehicle 20 on a road surface in a low friction state is stored in the memory of the ECU 1. In the feed forward control, a control value (target steering angle) θff to be given to the EPS 10 is derived from the low friction control map based on the actual running state of the vehicle sensed by the sensors shown in FIG. 1. As to the control value θfb, a gain and an offset amount used in the feedback control etc. are set based on the running state of the driver's own vehicle 20 on a road surface in a low friction state and the distance between the driver's own vehicle 20 and the solid object 30 etc.

If the determination made in step S107 is negative, which means that the road surface is not in a low friction state, the process proceeds to step S302, where a feed forward control value θff and a feedback control value θfb for cases in which the road surface is in a normal condition (high friction state) are set. A high friction control map for steering operation by means of the EPS 10 adapted to the running state (such as the vehicle speed) of the driver's own vehicle 20 on a road surface in a high friction state is stored in the memory of the ECU 1. The high friction control map is a control map different from the aforementioned low friction control map. In the feed forward control, a control value (target steering angle) Off to be given to the EPS 10 is derived from the high friction control map based on the actual running state of the vehicle sensed by the sensors shown in FIG. 1. As to the control value θfb, a gain and an offset amount used in the feedback control etc. are set based on the running state of the driver's own vehicle 20 on a road surface in a high friction state and the distance between the driver's own vehicle 20 and the solid object 30 etc.

In order to prevent the turning control from giving an uncomfortable feeling to the driver, the control value according to the low friction control map is adapted in such a way as to cause the driver's own vehicle to turn by an amount smaller than the amount of turning caused by the control value according to the high friction control map or not to cause the driver's own vehicle to turn. Therefore, the processing of changing the feed forward control value Off and the feedback control value θfb to those for a low friction state if it is determined based on the deceleration difference that the road surface is in a low friction state constitutes processing of correcting a normal control value (for a high friction state). Therefore, the processing of step S301 executed based on the result of the determination in step S107 corresponds to the processing performed by the control value correction part 104.

After completion of the processing of step S301 or S302, the process proceeds to step S303, where turning control of the driver's own vehicle 20 is executed by means of the EPS 10 in accordance with the control values set in step S301 or S302. In consequence, control values adapted to the frictional state of the road surface can be set appropriately, whereby avoidance of a collision with the solid object 30 can be achieved appropriately while preventing the problem of uncomfortable feeling to the driver, which can be caused when the road surface is in a low friction state, from occurring.

DESCRIPTION OF THE REFERENCE SIGNS

1: ECU
2: surrounding sensing device
3: yaw rate sensor
4: wheel speed sensor
5: acceleration sensor
6: brake sensor
7: accelerator sensor
8: steering angle sensor
9: steering torque sensor
10: EPS (electric power steering)
11: ECB (electronically controlled brake)
20: driver's own vehicle
30: solid object
100: track recognition part
101: target avoidance trajectory acquisition part
102: control value setting part
103: assistance control part
104: control value correction part

The invention claimed is:

1. A driving assistance system for a vehicle comprising:
a recognition part that recognizes a solid object existing in the direction of traveling of a driver's own vehicle;
a target control value setting part that sets, when the existence of said solid object is recognized by said recognition part, a target control value pertaining to control for avoiding a collision including turning control of the driver's own vehicle in order to bring a running state of the driver's own vehicle to a target running state that causes the driver's own vehicle to avoid a collision with said solid object;
a control part that controls the running state of the driver's own vehicle to avoid a collision with said solid object, in accordance with said target control value set by said target control value setting part; and
a control value correction part that corrects said target control value pertaining to the turning control of the driver's own vehicle based on the value of a state variable relating to the running state of the driver's own vehicle during the time in which the control by said control part is performed and said target control value associated with said state variable,
wherein said target controlled value setting part sets as said target controlled value a target deceleration in decelerating the driver's own vehicle for the purpose of avoiding a collision with said solid object and a target turning amount for the amount of turning of the driver's own vehicle in the turning control of the driver's own vehicle performed for the purpose of avoiding a collision, and
said controlled value correction part corrects said target turning amount pertaining to the turning control of the driver's own vehicle in such a way that when the difference between said target deceleration and the deceleration of the driver's own vehicle during the time in which the control by said control part is performed is larger than a predetermined reference difference, said target turning amount is changed to a controlled value that makes the amount of turning of the driver's own vehicle caused by said turning control smaller than when said difference is equal to or smaller than said predetermined reference difference or to a controlled value that obviates said turning control.

2. A driving assistance system for a vehicle according to claim 1, wherein said target control value setting part sets as said target turning amount a feed forward control value for feed forward control in the turning control of the driver's own vehicle performed to achieve said target running state and a feedback control value for feedback control performed to bring an actual turning state of the driver's own vehicle resulting from said feed forward control to a target turning state of the driver's own vehicle in said target running state, and
said control value correction part sets as said target turning amount only said feed forward control value, when the difference between said target deceleration and the deceleration of the driver's own vehicle during the time in which the control by said control part is performed is larger than said predetermined reference difference, and sets as said target turning amount said feed forward control value and said feedback control value, when said difference is equal to or smaller than said predetermined reference difference.

* * * * *